United States Patent
Doney et al.

(10) Patent No.: US 11,710,124 B2
(45) Date of Patent: Jul. 25, 2023

(54) METHOD, APPARATUS, AND COMPUTER-READABLE MEDIUM FOR SECURED MULTI-LATERAL DATA EXCHANGE OVER A COMPUTER NETWORK

(71) Applicant: SECURRENCY, INC., Annapolis, MD (US)

(72) Inventors: George Daniel Doney, Annapolis, MD (US); Ihor Yermakov, Abu Dhabi (AE); Manuel Rensink, Abu Dhabi (AE)

(73) Assignee: SECURRENCY, INC., Annapolis, MD (US)

( * ) Notice: Subject to any disclaimer, the term of this patent is extended or adjusted under 35 U.S.C. 154(b) by 234 days.

(21) Appl. No.: 17/211,432

(22) Filed: Mar. 24, 2021

(65) Prior Publication Data
US 2021/0304200 A1 Sep. 30, 2021

Related U.S. Application Data

(60) Provisional application No. 62/993,882, filed on Mar. 24, 2020.

(51) Int. Cl.
*G06Q 20/40* (2012.01)
*G06Q 20/36* (2012.01)
(Continued)

(52) U.S. Cl.
CPC .......... *G06Q 20/401* (2013.01); *G06Q 20/36* (2013.01); *H04L 9/0825* (2013.01);
(Continued)

(58) Field of Classification Search
CPC .. G06Q 20/401; G06Q 20/36; G06Q 2220/00; G06Q 20/02; G06Q 20/3674;
(Continued)

(56) References Cited

U.S. PATENT DOCUMENTS 8,316,237 B1 * 11/2012 Felsher ................ H04L 9/3249
380/282
9,419,951 B1 8/2016 Felsher
(Continued)

OTHER PUBLICATIONS

Duch-Brown et al. "The economics of ownership, access and trade in digital data." (2017). Feb. 17, 2017 (Feb. 17, 2017) Retrieved on May 30, 2021 (May 30, 2021) from <https://papers.ssrn.com/sol3/papers.cfm?abstract_id=2914144> entire document.
(Continued)

*Primary Examiner* — John W Hayes
*Assistant Examiner* — Yingying Zhou
(74) *Attorney, Agent, or Firm* — Neo IP (57) ABSTRACT

A method and apparatus for secured, multi-lateral, assured data transfer over a computer network for the assured exchange of data between counterparties related to qualifying transactions, the method being accomplished by a distributed computing system including a distributed ledger platform and an off-chain data host platform. On-chain authorization tokens are used to track data access rights, enforce access policies, and control distribution of encryption keys.

8 Claims, 8 Drawing Sheets

(51) Int. Cl.
*H04L 9/08* (2006.01)
*H04L 9/30* (2006.01)

(52) U.S. Cl.
CPC .............. *H04L 9/0894* (2013.01); *H04L 9/30* (2013.01); *G06Q 2220/00* (2013.01)

(58) Field of Classification Search
CPC . G06Q 20/3823; H04L 9/0825; H04L 9/0894; H04L 9/30; H04L 9/50; H04L 2209/56; H04L 9/3239
See application file for complete search history.

(56) References Cited

U.S. PATENT DOCUMENTS

| | | | |
|---|---|---|---|
| 10,193,696 B2 | 1/2019 | Struttmann et al. | |
| 10,489,597 B2 | 11/2019 | Safford et al. | |
| 10,673,626 B2 | 6/2020 | Sandberg-Maitland et al. | |
| 10,735,202 B2 | 8/2020 | Jayachandran et al. | |
| 11,159,307 B2 | 10/2021 | Bathen et al. | |
| 11,194,837 B2 | 12/2021 | Vo et al. | |
| 11,200,569 B1* | 12/2021 | James | G06Q 20/381 |
| 11,250,423 B2 | 2/2022 | Heyner | |
| 11,250,466 B2 | 2/2022 | Soundararajan et al. | |
| 11,301,460 B2 | 4/2022 | Rich et al. | |
| 11,308,487 B1* | 4/2022 | Foster | G06Q 20/3829 |
| 11,488,147 B2 | 11/2022 | Sheng et al. | |
| 11,488,161 B2 | 11/2022 | Soundararajan et al. | |
| 11,551,191 B2 | 1/2023 | McNamara et al. | |
| 2003/0190046 A1* | 10/2003 | Kamerman | H04L 9/3265 |
| | | | 713/176 |
| 2005/0257045 A1* | 11/2005 | Bushman | H04L 63/12 |
| | | | 713/156 |
| 2013/0042110 A1 | 2/2013 | Shablygin et al. | |
| 2017/0103385 A1* | 4/2017 | Wilson, Jr. | G06Q 20/38215 |
| 2018/0101844 A1* | 4/2018 | Song | H04L 9/30 |
| 2019/0287175 A1* | 9/2019 | Hill | G06Q 40/04 |
| 2020/0127834 A1* | 4/2020 | Westland | H04L 63/00 |
| 2021/0042735 A1 | 2/2021 | Majidi et al. | |
| 2021/0192501 A1 | 6/2021 | McNamara et al. | |
| 2021/0377263 A1 | 12/2021 | Law | |
| 2022/0051261 A1 | 2/2022 | Vetas | |
| 2022/0270080 A1 | 8/2022 | Yantis et al. | |

OTHER PUBLICATIONS

International Searching Authority, the International Search Report and the Written Opinion of the International Searching Authority for International Application No. PCT/US2021/023937 dated Jul. 12, 2021.

* cited by examiner

METHOD, APPARATUS, AND COMPUTER-READABLE MEDIUM FOR SECURED MULTI-LATERAL DATA EXCHANGE OVER A COMPUTER NETWORK

RELATED APPLICATION DATA

This application claims priority to U.S. Provisional Application No. 62/993,882 filed on Mar. 24, 2020, the entire disclosure of which is incorporated herein by reference.

FIELD OF THE INVENTION

The invention relates to securing and managing assured data exchange between multiple parties on the completion of a qualifying event.

BACKGROUND

There are many situations in which data must be exchanged over a computer network in a secure manner. For example, sensitive Personally Identifying Information (PII) is often transmitted over computer networks for medical diagnosis, regulation of financial transactions and other purposes. Further, there are applications in which a party should not, or does not want to, transmit data to other parties unless the transmitting party can be assured the other parties will reciprocate in transferring secured information back the party or to other parties. Such applications include regulated financial transactions, media licensing, permissions delegation applications and the like. In media licensing, different domains can share license information with each other to allow use of licensed content on various domains based on a license from a specific domain. Each domain my want to be assured that the other domains will do the same and share content use information, billing information, and the like. In permissions delegation, one party may wish to delegate digital rights (to use of a service or the like) to another party. The delegating party might want to ensure that the delegatee will provide the proper use information, billing information, or the like.

An example of transactions that require counterparties to conduct and assured exchange of confidential data on the completion of qualifying events are financial transactions. Financial Action Task Force (FATF) guidelines on virtual assets aim to identify parties involved in virtual asset (e.g., cryptocurrencies and other tokenized assets represented in digital form) transactions on pseudonymous blockchain networks in order to combat money laundering and crime and terrorism financing. Conventionally, virtual asset transactions are conducted over distributed ledger networks using "wallets", which correspond to a network address operated by one or more cryptographic keys that correspond to, but do not reveal, a party's identity. The guidelines, known as the "Travel Rule", require digital asset financial service intermediaries, that is Virtual Asset Service Providers (VASPs), to provide data identifying all participants in a value transfer. Beyond traditional Know Your Customer (KYC) responsibilities for its own clients, the VASP must also identify client counterparties (KYCC) even if the counterparties are clients of other VASPs. To conform to the guidelines, VASPs must exchange Personally Identifying Information (PII) on the customers involved in a transaction.

In accordance with the guidelines, to participate in the financial ecosystem, VASPs must be certified for proper KYC verification processes, protection of PIIs data, and an ability to meet the data exchange requirements specified in the guidelines. VASPs may not share PII information with unauthorized parties. This data may only be shared in the context of a qualifying transaction to meet regulatory requirements. To meet the regulatory standard, VASPs need assurance that the required data can and will be made accessible, in a secured manner, by the counterparty VASP once a qualifying transaction occurs (but not before). Since client data is sensitive to a VASP business and would not be shared willingly with a competing VASP, a party providing this information in the context of a qualifying transaction needs assurance that the counterparty will reciprocate. Without this assurance, the initiating VASP would be out of compliance (unable to meet reporting requirements) if it allows a transaction and the receiving VASP balks at its information sharing requirements.

Since the FATF guidelines require an exchange of information between parties, each party is dependent not only on its own capabilities but also proper behavior of all other ecosystem participants. In many cases, information exchange occurs in connection with transactions over a decentralized network, such as a blockchain, where there is not always a legal relationship or other trust relationship between the parties. In decentralized networks, parties participate in transactions through the above-noted wallets. Process flow in a decentralized network can be controlled by "smart contracts", i.e., executable code stored in a decentralized environment. Again, in many instances, the personal identity of the party associated with the wallet is not readily ascertainable. This presents significant technical issues that must be overcome to securely and mutually exchange data. Currently, there is no efficient mechanism for assuring the above-noted mutual and secure data exchange.

SUMMARY

The disclosed implementations overcome the limitations noted above with respect to secured mutual data exchange by providing a technical mechanism for secure, trustless data exchange through the minting and use of a data access tokens in a framework that ensures all participating parties, such as VASPs, that sensitive data is available when necessary, and only when necessary. The disclosed implementations are designed such that VASPs, or other parties, that might not have a relationship with, and might not trust, each other, have a secure way to protect their most valuable asset (their customer data) and only give out information when required, and when assured they will receive the counterparty's information.

Practical governance in a global confederated ecosystem of VASPs requires a layered certification process: a process for verifying verifiers, verifying VASPs, and verifying VASP customers, e.g., transacting parties. The disclosed implementations permit the verification of "unhosted" wallets, i.e., wallets that are not controlled by a VASP and hence have not previously been able to participate in Travel Rule compliant transactions. This has become very important as the Travel Rule guidelines have been implemented by several jurisdictions (e.g., Netherlands, Switzerland, under FINCEN consultation in the US) to include unhosted wallets. Disclosed implementations include a layered certification process to register—or "green light"—such unhosted wallets while not requiring the wallet holder to give up their private key, thus keeping personally identifiable information off-line and re-usable, thereby increasing privacy and data protection in computer network communications.

Coupled to the verification/certification process, is the assured delivery of data associated with a qualifying transaction. The disclosed implementations can include an "on-chain" token registry and an "off-chain" data host, as well as other distributed components, as described in detail below.

One aspect of the disclosed implementations is a method for secured, multi-lateral, assured data transfer over a computer network for the exchange of data $D_1$ related to qualifying transactions, the method being accomplished by a distributed computing system including a distributed ledger platform and a data host platform, the method comprising:

(a) transferring, from a sending party to a receiving party, access rights to $D_1$, the transferring including:

the sending party generating an encryption key, $K_1$, encrypting $D_1$ with $K_1$ using a symmetric encryption algorithm to create encrypted data $D_1^*$;

the sending party transmitting $D_1^*$ to the data host platform, wherein the data host platform cannot access $D_1$;

the sending party receiving a pointer to $D_1^*$, an uniform resource identifier $D_1^*\text{ID}$ that corresponds to $D_1^*$;

the sending party encrypting $K_1$ with a public key of the receiving party using an asymmetric encryption algorithm to create an encrypted key $K_1^*$;

the sending party signing an Issue transaction via a WalletRegistry smart contract on a distributed ledger platform to create an AuthToken, that is a transferrable non-fungible token on a distributed ledger that expresses a data structure containing $D_1^*\text{ID}$, $K_1^*$, and other data such as access policy; and transferring the AuthToken to a cryptographic wallet associated with the receiving party; and (b) accessing $D_1$ by the receiving party, the accessing including:

the receiving party signing an access transaction via the WalletRegistry smart contract on the distributed ledger platform resulting in the creation of a session ID, $S_1$;

the receiving party sending an access request for $D_1^*$ to the data host platform including $S_1$ and $D_1^*\text{ID}$;

the data host platform validating the request platform by calling the WalletRegistry smart contract on the distributed ledger platform which consults data authorization policy for validation;

in response to the validating, the data host, encrypting $D_1^*$ with the public key of the recipient using asymmetric encryption, resulting in $D_1^{}$, and sending $D_1^{}$ to the receiving party; and the receiving party decrypting $D_1^{**}$ using the receiving party's private key using asymmetric encryption resulting in $D_1^*$, decrypting the encryption key $K_1^*$ with the receiving party's private key using asymmetric encryption resulting in $K_1$, and decrypting the escrowed data $D_1^*$ with the encryption key $K_1$ using symmetric encryption resulting in $D_1$ to thereby gain access to the data $D_1$;

An addition aspect of the implementation is a mechanism to verify that counterparty wallets are registered, certified by a qualified verification agent, and assured to provide the required data using the disclosed process for a qualifying transaction a priori, that is, prior to initiating the transaction, by querying the WalletRegistry smart contract where all registered addresses who have completed the data escrow process are listed;

Another aspect is the process for generating or validating a session ID $S_1$ in the Wallet Registry smart contract that includes retrieving, interpreting, and enforcing an access policy, if assigned the to AuthToken, to determine whether to initiate the access session, where the policy may include rules regarding the qualifying attributes of a transaction, sending party, receiving party, or other context. Policy access, interpretation, and enforcement can be an implementation of the policy engine described in U.S. patent application Ser. No. 16/143,058, the disclosure of which is incorporated herein by reference.

DETAILED DESCRIPTION

Disclosed implementations are discussed in the context of digital asset transactions through a network of VASPs. However, the innovations disclosed herein can be applied to any parties or situation in which there is a need for mutually assured secure data exchange. The terms "party" and "parties" refer to computing platforms associated with participating entities, as well as the entities, individually and collectively as indicated by context of the use. As noted above, the FATF guidelines require an exchange of information between parties, each party is dependent not only on its own capabilities but also proper behavior of other ecosystem participants. Disclosed implementations include two technical innovations for supporting a compliance framework for a global ecosystem of parties, such as VASPs, who are subject to the oversight of different regulators. First, a layered or confederated governance framework by which participants can "police their own", that is certify the certifiers to ensure all participating parties can meet the obligations. And second, a data exchange, architecture, model, and process that ensures required data is securely stored prior to transaction authorization and released for access only after a qualifying transaction occurs.

Figure 1:
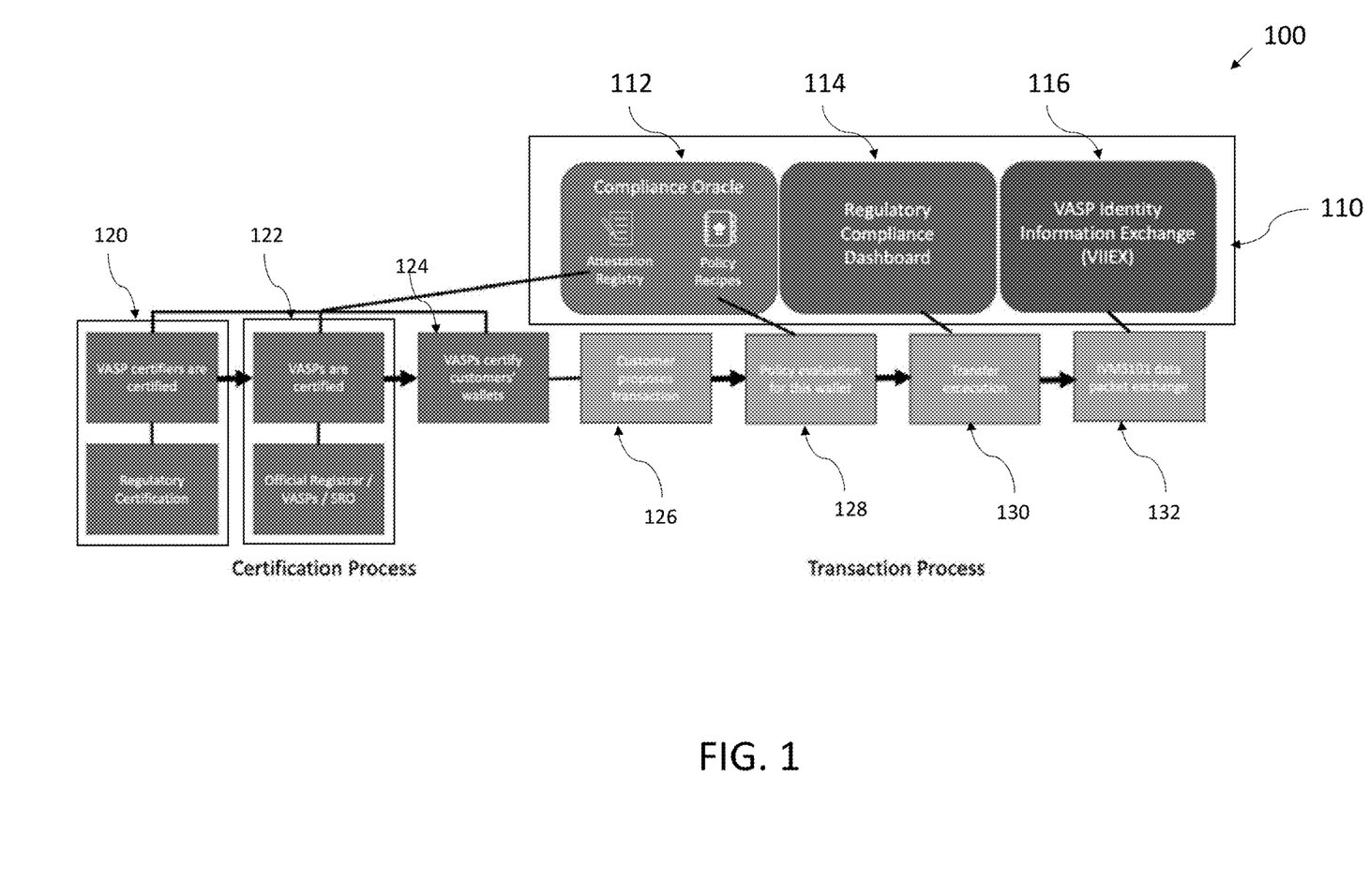
FIG. 1 is a block diagram of a high level workflow in accordance with disclosed implementations.

FIG. 1 illustrates an architecture and method for certification of parties and conducting secured information exchange. This example relates to transactions by VASPs on behalf of other parties, such as customers of the VASPs. Architecture 100 includes common data store 110 where a VASP acting as a Certification Agent is given the right to write KYC status and other attributes associated with a public blockchain address in the context of an unhosted wallet, e.g., KYC on party X that is not the VASP's customer and where party X at all times retains control over its wallet and does not share its private key. Common data store 110 includes compliance oracle 102, regulatory compliance dashboard 104, and identity information exchange (IIEX) 106, all of which can be executed as computing platforms, and which are described in greater detail below.

The certification of hosted wallets can be a part of a larger verification process to be used with a transaction process for Travel Rule compliance or other secured mutual data exchange, which is described in detail below. At step 120, a certifier and their authorized personnel are registered, who in turn will certify the VASPs. Typically, a regulator or an appointed Self-Regulatory Organization would administer this step. Analogous to the way that FINRA in the US administers a broker register. This chain of authority is rooted, revocable, and scalable, and can be applied to the attestation of any right governed by a confederation of parties. At step 122, VASPs and their authorized personnel registered by the certifier. This ensures that this person is a known and real user who is authorized by a representative of the VASP with the authority to speak on behalf of the VASP for performing actions in name of the VASP. VASP representatives provide KYC documentation on both themselves and their employer—the VASP legal entity. A VASP official registrar approves the KYC of the natural person and VASP legal entity details as valid.

The certification information provided in steps 120, 122, and 124, and related supporting documents, can be saved in encrypted form in IIEX 116. Attestation regarding compliant VASP status is created and the open, decentralized IIEX 116 is updated with this information. As an example, IIEX and other portions of data store 110 can be a distributed ledger such as a blockchain. For example, this information can be stored in the distributed ledger component described below with respect to FIG. 2.

Once the VASP has been approved, the user is able to configure entity structure, including subsidiary entities, departments, and individuals who will be performing functions and who will have access to perform finance, certification agent and other business functions. This approach to the certification process allows VASPs to protect their most important asset—their clients and their clients' data—and does not require them to custody non-client PII data. Furthermore, it supports a centralized (e.g., regulator-centric) and more decentralized certification processes (e.g., SRO or inter-VASP trust network). Other VASPs can now verify that this entity is Travel Rule compliant via API, or even on-chain when the framework is extended to third parties, for instance VASPs in an overseas trust network.

At step 124, the certified VASPs certify their customer's wallets. The authorized persons at the VASPs will register their customers' account and wallet information on the system. This will be done by linking blockchain wallet addresses to Personally Identifiable Information (PII), and other attributes such as Know Your Customer (KYC) status. Step 124 can include: (a) the user providing KYC documentation via an associated VASP portal; (b) the authorized VASP compliance officer approving KYC details as valid; and (c) creation of attestation information and updating and attestation registry of compliance oracle 112.

Any VASP in the cluster can now verify that this user's wallet (their public address) has been attested as a "KYC'ed" user by the user's VASP and that the PII details can be retrieved per regulatory requirements when a qualifying transaction occurs. In a global extension of this framework, compliance oracle 112 can be hosted on a blockchain or other distributed ledger and the compliant status (not the PII) can be broadcast for smart contract use, global wallet discovery and integration into third-party Travel Rule solutions, as described with respect to FIG. 2 below.

The authorized persons at the VASPs can also register a non-customer by linking blockchain wallet addresses to Personally Identifiable Information (PII), and other attributes such as Know Your Customer (KYC) status. This process can include: (a) the individual provides KYC/PII documentation via a VASP portal; (b) the authorized VASP compliance officer approves the KYC details as valid; (c) the individual proves to have control over a public wallet (by signing a blockchain transaction or sending a small amount of a virtual asset, similar to the way it's done currently by banks and apps); and (d) creating attestation information and updating the attestation r of compliance oracle 112 with the new attestation information. Any VASP in the cluster can now verify that this user's wallet (the user's public address) has been attested as a KYC'ed party by the certification agent and that the PII details can be retrieved per regulatory requirements when a qualifying transaction occurs. In a global extension of this framework, the Compliance Oracle can be hosted a blockchain or other distributed ledger and the compliant status (not the PII) can be broadcast for smart contract use, global wallet discovery and integration into third-party Travel Rule solutions.

As noted above, the registration/certification process can be leveraged to ensure secure mutual exchange of data, for financial transactions or other applications. Once the certification is done, the transaction process and data access process can be accomplished. The transaction process takes place when a party, such as a VASP or VASP customer, initiates a transaction of a digital asset at step 126. The system will recognize whether the customer wallets and the VASPs involved in the transaction have been certified (i.e., "green lighted"), and would automatically flag or prohibit any transaction if any of the involved parties has not been green lighted. Before any transaction is executed, at step 128, the customer wallet policy is evaluated for eligibility, to ensure compliance or policy requirements. This compliance procedure can utilize a policy engine which can be an implementation of the policy engine described in U.S. patent application Ser. No. 16/143,058, the disclosure of which is incorporated herein by reference. At step 130, the transaction is executed, under control of the policy engine, and at step 132, data, in the form of IVMS101 data packets for example, are exchanged in a secure manner. An IVMS101 data package is an industry-adopted data standard developed by the InterVASP™ working group that contains all the necessary information for compliant Travel Rule transactions.

Regulatory compliance dashboard 114 displays, in a configurable format, all the operations related to transactions and the Travel Rule data on source and beneficiary VASPs and VASP customers based on information stored in IIEX 116. This will include relevant PII data, entity data, and all transaction details. Disclosed implementations can be applied to four scenarios.

Hosted wallets: A verified customer of licensed VASP making a cryptocurrency transfer to a verified customer of another licensed VASP.

Unhosted Wallets: Two verified individuals making a cryptocurrency P2P transaction using Metamask—an open-source unhosted wallet.

Unregistered Wallet: A customer of a licensed VASP using her hosted wallet to transfer cryptocurrency to an unknown address (not known if hosted or unhosted).

A licensed VASP making an internal transfer between two custody wallets.

Each transaction appears in the reporting with all relevant details enabling the regulator to exercise real-time supervision of digital assets in their jurisdiction. The Identity Information Exchange is the platform that regulates how, when and under which conditions data is exchanged and examined in detail below. Once again, in this example, the transaction is an exchange of a digital asset. However, the transaction can be any type of exchange or other transaction.

There are significant technical challenges that must be addressed in order to accomplish the functions noted above. These challenges result from at least three pragmatic considerations: (1) parties, such as VASPs, don't want to give up customer information without need; (2) parties, such as VASPs, must have a secure mechanism to provide such information when there is such as need, such as a qualifying digital asset transaction; and (3) parties, such as VASPs, must have assurance that counterparties will provide corresponding information required for internal diligence and regulatory reporting.

Figure 2:
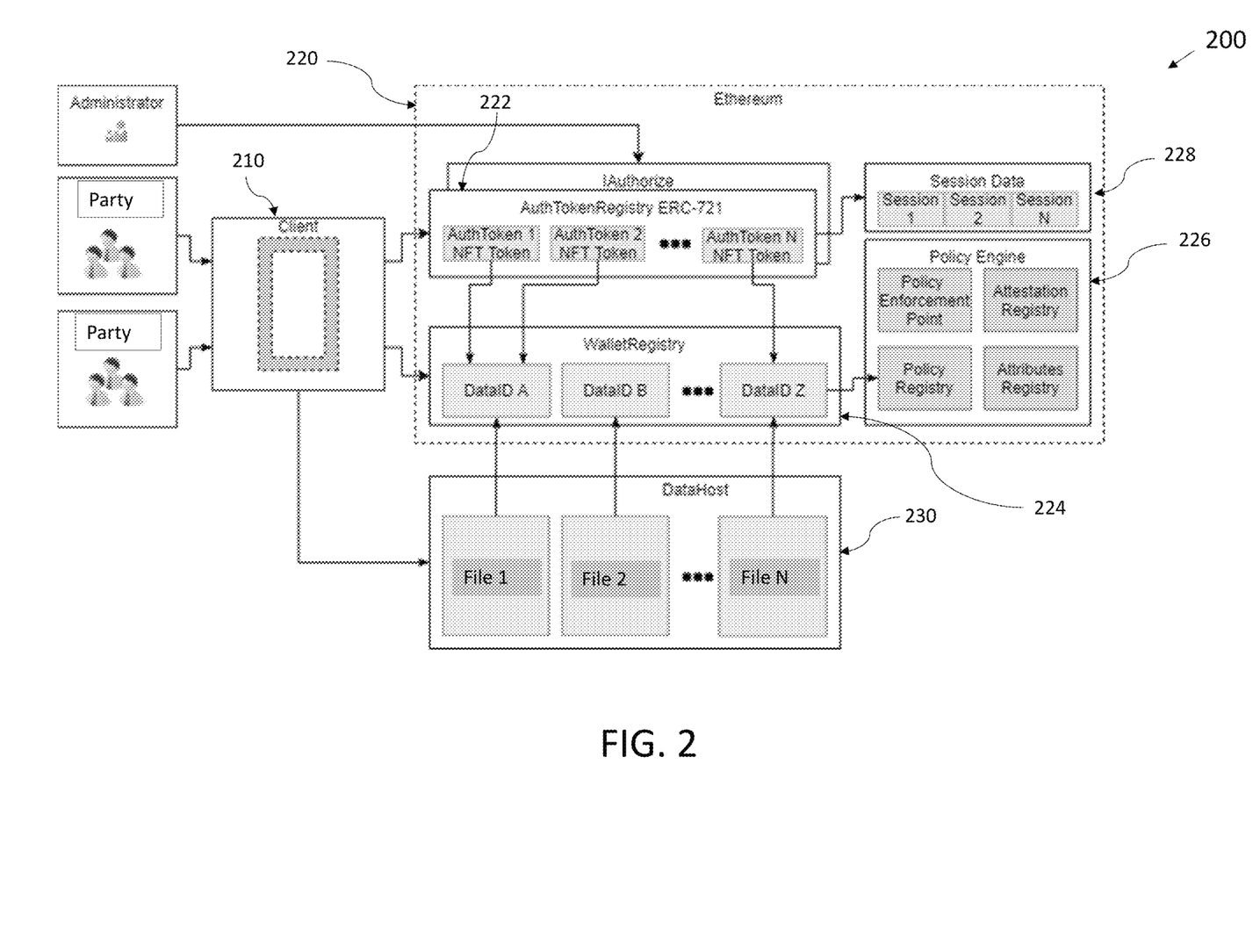
FIG. 2 is a schematic diagram of a distributed computing system in accordance with disclosed implementations.

FIG. 2 illustrates a distributed networked computing system 200 in accordance with a disclosed implementation. System 200 addresses the above-noted technical issues through a distributed computing system including client interface computing platform 210 (also referred to as "client 210"), off-chain data host 230, and on-chain distributed ledger platform 220 for registration of wallets and secure, assured transfer of access rights to client data when a qualifying transaction occurs. Distributed ledger platform 220 is a decentralized infrastructure such as an Ethereum blockchain or other distributed ledger technology. Data host 230 can be implemented as off-chain data storage for storing encrypted PII data or other sensitive data which cannot be decrypted by the data host 230. The encrypted data may be hosted using on-premises storage, cloud storage, decentralized storage systems such as IPFS (IPFS decentralized data storage), or other storage techniques.

Distributed ledger platform 220 includes authorization token registry 222 ("AuthTokenRegistry") and Wallet Registration Smart Contract(s) 224 ("WalletRegistry"). Disclosed implementations can use an extended ERC-721 token for the on-chain representation of the authorization tokens ("AuthToken"). As noted above, data host 230 can be used for storage of encrypted data. For example, IPFS (https://ipfs.io/) can be used for cloud storage of encrypted documents. IPFS (InterPlanetary File System) is a decentralized storage solution for blockchain-based content. When using IPFS, files are divided into parts and stored across a network of nodes, that track the file by hashes. The parts can be assembled together, based on their hash value, to recreate the original file. In the examples herein, clusters of data are referred to as "files". However, the "files" can be one or more packets or clusters and need not be stored as a single file in the conventional sense of the word.

The data host has no access to the unencrypted data. Policy engine 226 of distributed ledger platform 220 ensures regulatory compliance for any transactions and includes a policy enforcement point (PEP), a policy registry, and attestation registry and an attributes registry. As noted above, policy engine 226 can be an implementations of the policy engine described in U.S. patent application Ser. No. 16/143,058.

Client 210 and data host 230 can be implemented using a range of hardware, software programming and architecture techniques. Disclosed implementations can use C++, Java, node.js, Flutter, React, or any other modern programming language for the client interface and data host. The Client interface can use symmetric and asymmetric encryption, while the data host can use asymmetric encryption, as described in greater detail below.

As noted above encryption can be used to protect data from unauthorized access. In disclosed implementations, two encryption layers are used. The first layer protects the document from access by data host 230 or any other unauthorized party. The second layer enables access rights transfer to authorized recipients within a session established on distributed ledger platform 220.

Figure 3:
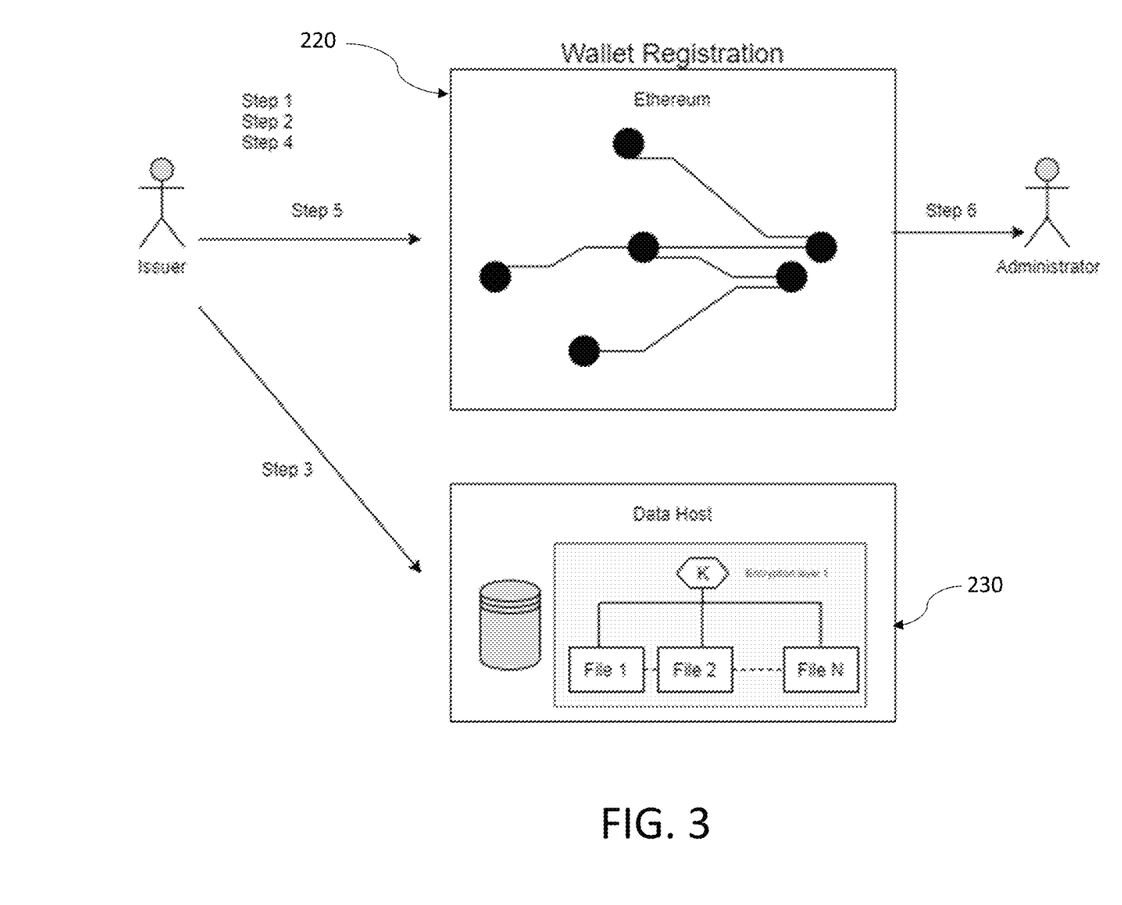
FIG. 3 is a schematic illustration of a wallet registration workflow in accordance with disclosed implementations.

As shown in FIG. 3, VASPs can register verified wallets for transactions. To register a wallet, a VASP that is a certified party with PII data (one or more files or datasets) to share on the owner of a wallet (any on-chain or off-chain address) creates a key K for encryption using known key generation techniques, at step 1. The VASP retains K. At step 2, the VASP then encrypts, using a symmetric encryption algorithm, the PII data using key K. At step 3, the VASP then sends the encrypted data, using client 210, to data host 230 and data host 230 generates an internal ID "DataID" that can be used to identify and retrieve the encrypted PII data in the system. At step 4, the VASP encrypts key K, using an asymmetric encryption algorithm, with the public key of the administrator (e.g., a regulator) wallet Recipients' wallets resulting in an access key "AccessKey" for the administrator wallet. As a result, only the party who holds the private key for the public address may decrypt the contents—therefore, only the desired recipient of the PII may decrypt the PII data. Note, the sender is not required to have the private key in order to encrypt the contents. At step 5, the VASP signs a register request to the blockchain authorization token registry 222 to issue one or more AuthToken(s), by means of a smart contract of the distributed ledger platform 220, for an administrator (for example a regulatory agency) who will have access to the data. At step 6, the issued AuthToken is sent to a wallet corresponding to an administrator. The AuthToken can be a non-fungible token (NFT) expressed as a data structure that contains (at least):

AuthTokenID (a unique token identifier)
AccessKey (generated in step 4 above)
DataID (generated in step 3 above)
PolicyID (for identifying a policy to be applied/enforced by policy engine 226)
Source (Owner of data)=VASP wallet
Client Wallet Address (or account identifier)

Figure 4:
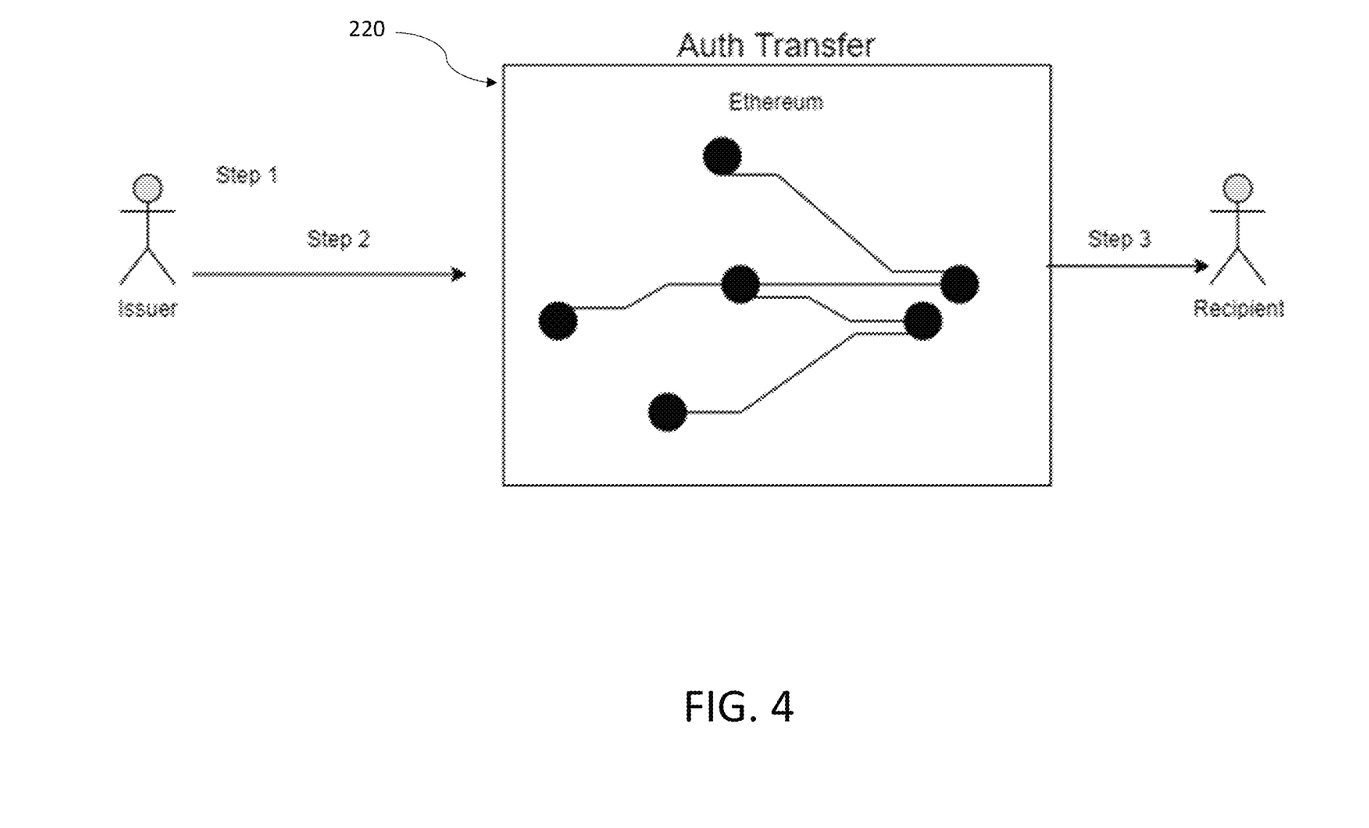
FIG. 4 is a schematic illustration of an information rights authorization transfer workflow in accordance with disclosed implementations.

FIG. 4 illustrates the steps for a VASP, as an originating party to provide data access rights to a receiving party, such as counterparty VASP or a regulator, in accordance with a disclosed implementation. Of course, in a multilateral exchange of data each party may implement the process of FIG. 4 to provide data access to the other party or multiple parties. At step 1, a first party, such as an issuing VASP asymmetrically encrypts key K using the public key of one or more wallets of a second party, such as a recipient VASP to thereby create an AccessKey for each wallet that will receive authorization. At step 2, the issuing VASP signs and authorize request to distributed ledger platform 220 to cause a smart contract to issue one or more AuthToken(s) for the recipient VASP(s) who will have access to the data when a qualifying transaction occurs. The AuthToken data structure is described above. Note that the Source of the AuthToken data structure indicate the wallet of the issuer party, such as a VASP. At step 3, AuthTokens are sent to wallets of recipient parties, such as counterparty VASPs and/or regulators.

Figure 5:
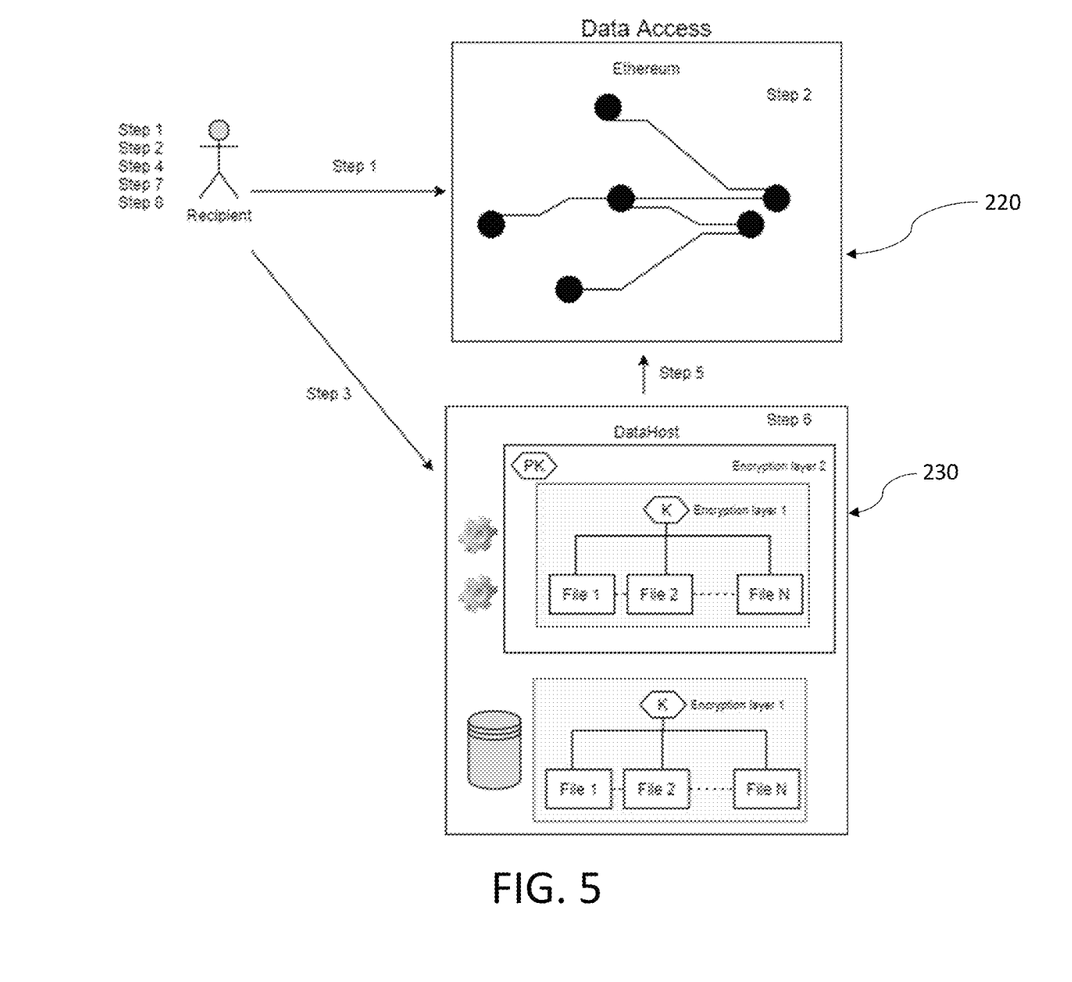
FIG. 5 is a schematic illustration of a data access workflow in accordance with disclosed implementations.

FIG. 5 illustrates the steps for the receiving party, such as a recipient VASP(s), to gain access to encrypted data, such as encrypted PII data relating to a digital asset transaction, based on the rights granted above. Of course, in a multilateral exchange of data each party may implement the process of FIG. 5 to provide data access to the other party or multiple parties. At step 1, the certified Recipient VASP signs an access request message including AuthTokenID to distributed ledger platform 220 to open an authorization session for the requested data. At step 2, a smart contract on distributed ledger platform 220 checks whether the Recipient VASP is an AuthToken holder for the requested data, i.e. has been granted access rights consistent with the authorization request, consulting with the policy engine, which can be an implementation of the policy engine described in U.S. patent application Ser. No. 16/143,058, the disclosure of which is incorporated herein by reference, and has supported a qualifying transaction for the client wallet. If yes, a SessionID is generated. The SessionID is stored on-chain in session registry 228 (see FIG. 2). The SessionID can contain AuthTokenID for the corresponding AuthToken, time to live (TTL) or other expiration data, and rights data. At step 3, the recipient VASP sends a request message containing the SessionID to data host 230. At step 4, data host 230 sends a request message containing the SessionID to on-chain platform 220 to obtain DataID and TTL data and the public key PK of an account associated with the authorization request. During this step, the Wallet Registry smart contract may consult the policy engine to determine if a qualifying transaction has occurred or other conditions have been met prior to sending a response containing the encrypted data.

At step 5, data host 230 retrieves the corresponding encrypted files using the DataID and encrypts the files again using the public key PK of the wallet requesting access (this effects encryption layer 2 noted above). At step 6, the recipient VASP decrypts the data using its wallet's private key resulting in data packet with encryption layer 1 noted above (i.e., data encrypted with key K). At step 7, the recipient VASP decrypts AuthTokenID using its private key yielding encryption key K and, at step 8, the recipient VASP decrypts data using key K to thereby gain access to the data.

Figure 6:
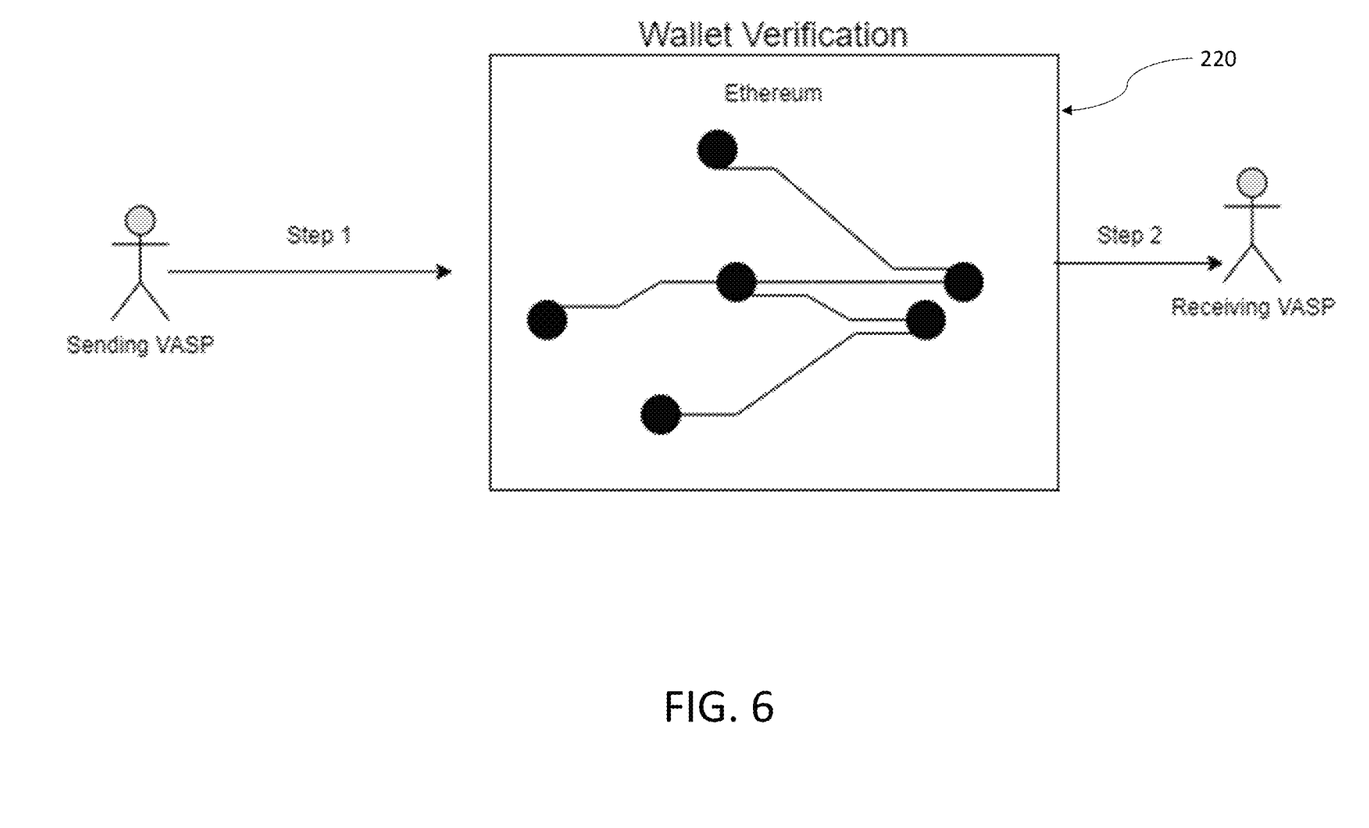
FIG. 6 is a schematic illustration of wallet verification workflow in accordance with disclosed implementations.

FIG. 6 illustrates the steps for wallet verification. Prior to enabling a transfer to a third party wallet, the sending VASP verifies the presence of an AuthToken for the counterparty wallet in step 1. Prior to enabling receipt of a transfer from a third party wallet, the receiving VASP verifies the source address has been verified by a certifies VASP by checking wallet registry 224 in step 2. Alternatively, the token being transferred can have internal logic as part of the smart contract transfer function, that checks wallet registry 224 for registration of the sending and receiving wallet prior to allowing transfer.

The workflows above describe the use of a data access token in the process of a secure, conditional exchange of information where multiple parties can be assured that the data is both properly used and is available on meeting the conditions. The originating party can have certainty in advance of a transaction that if it lets its transaction occur, the appropriate information will be made available to specified parties, whether the beneficiary wants to share that information or not. And vice versa, the beneficiary is guaranteed that it, and/or other appropriate parties, will have access to information about the sender. The novel combination of data structures, on-chain and off-chain registries, key management and secure message flows allow the parties to be assured of secure mutual data exchange. Note that, an implementation may only use the initial transfer of Authorization to the Administrator (Regulator) wallet. If AuthTokens are not sent to counterparty VASPs, only the regulator can see qualifying transactions and VASP would not share the PII data with other (competing) VASPs. Using this alternative method, a reporting service can limit distribution of PII data only to regulators required and authorized to view the data. The disclosed implementations include one or more of the rights transfer and data access processes described above.

Figure 7:
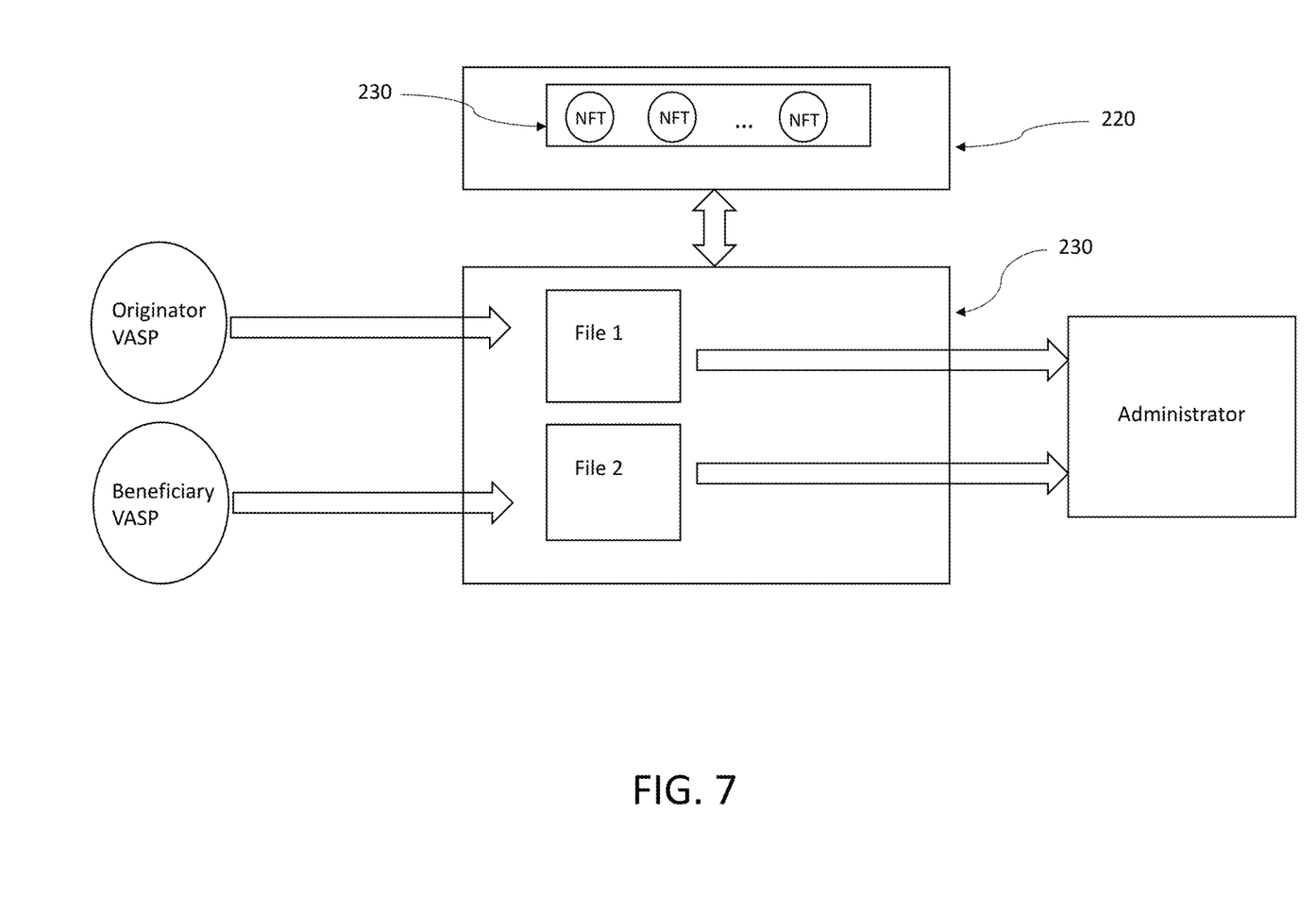
FIG. 7 illustrates a flow of permission rights to data in accordance with disclosed implementations.

As shown in FIG. 7 information, in the form of file 1, is transmitted to data store 230 by an Originator VASP and information, in the form of file 2, is transmitted to data store 230 by a Recipient VASP. Upon a completed transaction, such as transfer of a digital asset, the information is made available to an administrator, such as a regulatory agency, in accordance with rights represented by NFTs minted by distributed ledger platform 220.

Figure 8:
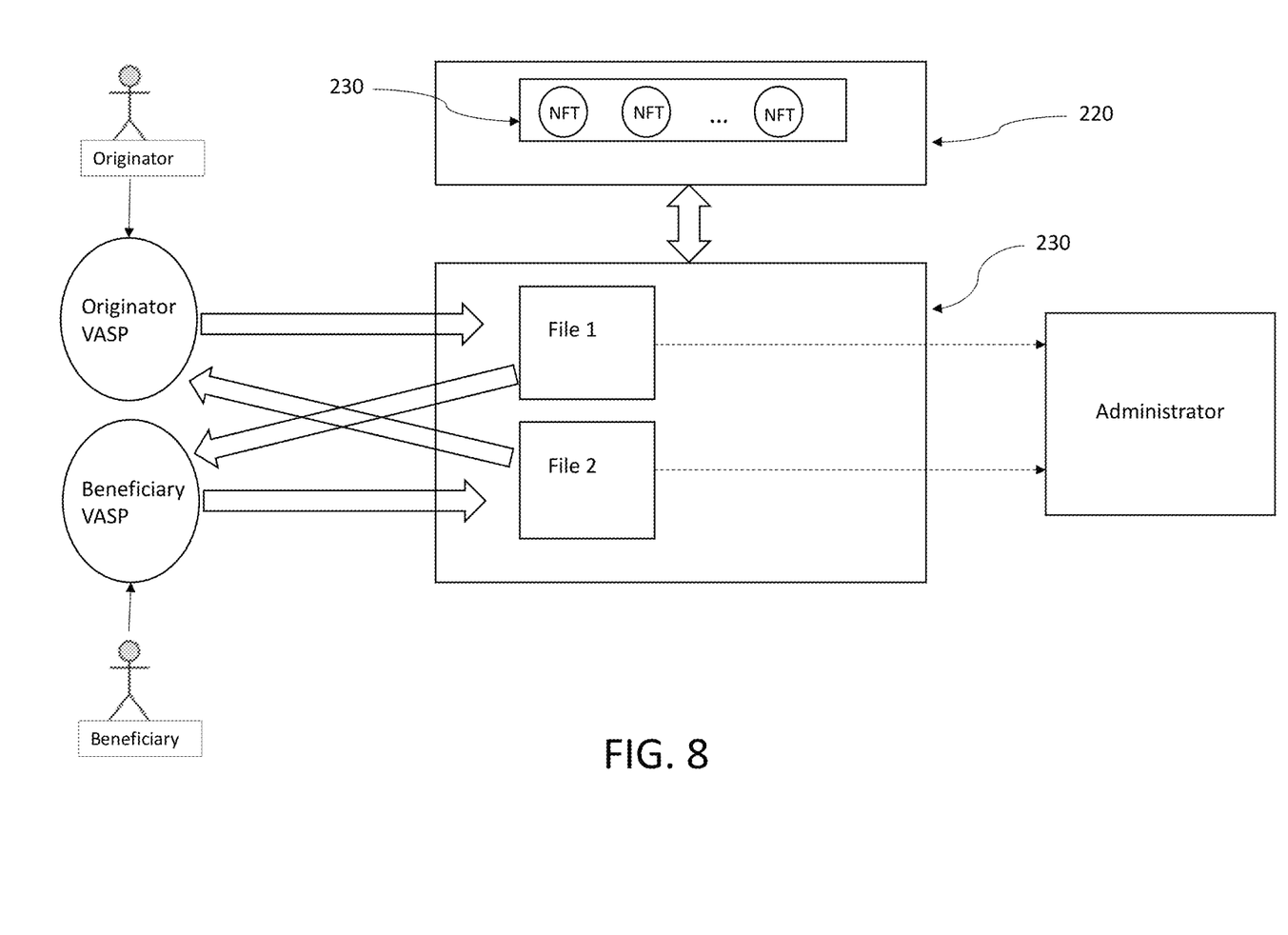
FIG. 8 illustrates a flow of permission rights to data in which transaction parties receive counterparty information in accordance with disclosed implementations.

As shown in FIG. 8 information, in the form of file 1, is transmitted to data store 230 by an Originator VASP and information, in the form of file 2, is transmitted to data store 230 by a Recipient VASP. Upon a completed transaction, such as transfer of a digital asset, the information is made available to the counterparty VASP in accordance with rights represented by NFTs minted by distributed ledger platform 220. The information of FIG. 8 can also be made available to an administrator as described in FIG. 7.

The disclosed implementations can be implemented by various computing devices programmed with software and/or firmware to provide the disclosed functions and modules of executable code implemented by hardware. The software and/or firmware can be stored as executable code on one or more non-transient computer-readable media. The computing devices may be operatively linked via one or more electronic communication links. For example, such electronic communication links may be established, at least in part, via a network such as the Internet and/or other networks.

A given computing device may include one or more processors configured to execute computer program modules. The computer program modules may be configured to enable an expert or user associated with the given computing platform to interface with the system and/or external resources. By way of non-limiting example, the given computing platform may include one or more of a server, a desktop computer, a laptop computer, a handheld computer, a tablet computing platform, a Smartphone, a gaming console, and/or other computing platforms.

The various data and code can be stored in electronic storage devices which may comprise non-transitory storage media that electronically stores information. The electronic storage media of the electronic storage may include one or both of system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

While implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

What is claimed is:

1. A method for secured, multi-lateral, assured data transfer over a computer network for the exchange of data $D_1$ related to qualifying transactions, the method being accomplished by a distributed computing system including a distributed ledger platform and a data host platform, the method comprising:
   (a) transferring, from a sending party to a receiving party, access rights to $D_1$, the transferring including:
   the sending party generating an encryption key, $K_1$, and encrypting $D_1$ with $K_1$ using a symmetric encryption algorithm to create encrypted data $D_1^*$;
   the sending party transmitting $D_1^*$ to the data host platform, wherein the data host platform cannot access $D_1$;
   the sending party receiving a pointer to $D_1^*$, the pointer a universal resource identifier $D_1^*ID$ that corresponds to $D_1^*$;
   the sending party encrypting $K_1$ with a public key of the receiving party using an asymmetric encryption algorithm to create an encrypted key $K_1^*$;
   the sending party signing an Issue transaction via a WalletRegistry smart contract on a distributed ledger platform to create an AuthToken, that is a transferrable non-fungible token on a distributed ledger that expresses a data structure containing $D_1^*ID$, $K_1^*$, and other data such as access policies; and
   transferring the AuthToken to a cryptographic wallet associated with the receiving party; and
   (b) accessing $D_1$ by the receiving party, the accessing including:
   the receiving party signing an Access transaction via the WalletRegistry smart contract on the distributed ledger platform resulting in the creation of a session ID, $S_1$;
   the receiving party sending an access request for $D_1^*$ to the data host platform including $S_1$ and $D_1^*ID$;
   the data host platform validating the request platform by calling the WalletRegistry smart contract on the distributed ledger platform which consults data authorization policy for validation;
   in response to the validating, the data host, encrypting $D_1^*$ with the public key of the recipient using asymmetric encryption, resulting in $D_1^{}$, and sending $D_1^{}$ to the receiving party; and
   the receiving party decrypting $D_1^{**}$ using the receiving party's private key using asymmetric encryption resulting in $D_1^*$, decrypting the encryption key $K_1^*$ with the receiving party's private key using asymmetric encryption resulting in $K_1$, and decrypting the escrowed data $D_1^*$ with the encryption key $K_1$ using symmetric encryption resulting in $D_1$ to thereby gain access to the data $D_1$.

2. The method of claim 1, wherein $D_1$ includes personally identifying information (PII) related to participants in regulated financial transactions between financial intermediaries including an Originating Virtual Asset Service Provider (VASP), a Beneficiary VASP, and as least one regulator and wherein steps (a) and (b) are conducted a first time and a second time to accomplish a first transfer/access process and a second transfer/access process and wherein:
   the first transfer/access process is between the Originating VASP as the sending party and the at least one regulator as the receiving party with $D_1$ being PII associated with the owner of the originating wallet in a transaction, the transfer resulting in the registration of the originating wallet as a certified address;
   the second transfer/access process is between the Beneficiary VASP as the Sender and the Regulator as the receiving party with $D_1$ being PII associated with the owner of the beneficiary wallet in a transaction, the transfer resulting in the registration of the originating wallet as a certified address; and
   wherein, receiving parties access the data required to meet regulatory requirements after a qualifying transaction occurs.

3. The method of claim 2, wherein steps (a) and (b) are conducted a third time and a fourth time to accomplish a third transfer/access process and a fourth transfer/access process and wherein:
   the third transfer/access process is between the Originating VASP as the sending party and the Beneficiary VASP as the receiving party with $D_1$ being PII associated with the owner of the originating wallet in a transaction; and
   the fourth transfer/access process is between the Beneficiary VASP as the sending party and the Originating VASP as the receiving party with $D_1$ being PII associated with the owner of the beneficiary wallet in a transaction.

4. The method of claim 1 wherein steps (a) and (b) are conducted 4 times to accomplish a first transfer/access process, a second transfer/access process, a third transfer/access process and a fourth transfer/access process and wherein:
   the first transfer between the Originator as the sending party and the Originating VASP as the receiving party with $D_1$ being PII associated with the owner of the originating wallet in a transaction, the transfer resulting in the registration by the Originating VASP of the originating wallet as a certified address;
   the second transfer between the Beneficiary as the sending party and the Beneficiary VASP as the receiving party with $D_1$ being PII associated with the owner of the beneficiary wallet in a transaction, the transfer resulting in the registration by the Beneficiary VASP of the originating wallet as a certified address;
   the third transfer between the Originating VASP as the sending party and the Beneficiary VASP as the receiving party with $D_1$ being PII associated with the owner of the originating wallet in a transaction;

the fourth transfer between the Beneficiary VASP as the sending party and the Originating VASP as the receiving party with $D_1$ being PII associated with the owner of the beneficiary wallet in a transaction; and wherein receiving parties access the data to meet regulatory requirements.

5. The method of claim 1, wherein the process for generating or validating a session ID $S_1$ in the Wallet Registry smart contract includes:

retrieving, interpreting, and enforcing an access policy, if assigned the to AuthToken, to determine whether to initiate the access session, where the policy may include rules regarding the qualifying attributes of a transaction, sending party, receiving party, or other context.

6. The method of claim 1, wherein each non-fungible digital token is expressed as a data structure that contains:

AuthTokenlID (a unique token identifier),
AccessKey ($K_1$* above),
DataID ($D_1$*ID),
PolicyID (for identifying a policy to be applied/enforced by policy engine),
Source (Owner of data),
Client Wallet Address (or account identifier),
Data Verification Entity.

7. The method of claim 1, further comprising retrieving, interpreting, and enforcing an access policy, assigned the to AuthToken, to determine prior to the access step, wherein the policy includes one or more of rules regarding the qualifying attributes of a transaction, a sending party, a receiving party, and transaction context.

8. An apparatus for secured, multi-lateral, assured data transfer over a computer network for the exchange of data D1 related to qualifying transactions, the apparatus including a distributed ledger platform and a data host platform, the apparatus comprising:

at least one computer processor; and at least one memory device having instructions sotred thereon which, when executed by the at least one processor cause the apparatus to accomplish the method of:

(a) transferring, from a sending party to a receiving party, access rights to D1, the transferring including:

the sending party generating an encryption key, K1, and encrypting D1 with K1 using a symmetric encryption algorithm to create encrypted data D1*;

the sending party transmitting D1* to the data host platform, wherein the data host platform cannot access D1;

the sending party receiving a pointer to D1*, the pointer a universal resource identifier D1*ID that corresponds to D1*;

the sending party encrypting K1 with a public key of the receiving party using an asymmetric encryption algorithm to create an encrypted key K1*;

the sending party signing an Issue transaction via a WalletRegistry smart contract on a distributed ledger platform to create an AuthToken, that is a transferrable non-fungible token on a distributed ledger that expresses a data structure containing D1*ID, K1*, and other data such as access policies; and transferring the AuthToken to a cryptographic wallet associated with the receiving party; and (b) accessing D1 by the receiving party, the accessing including:

the receiving party signing an Access transaction via the WalletRegistry smart contract on the distributed ledger platform resulting in the creation of a session ID, S1;

the receiving party sending an access request for D1* to the data host platform including S1 and D1*ID;

the data host platform validating the request platform by calling the WalletRegistry smart contract on the distributed ledger platform which consults data authorization policy for validation;

in response to the validating, the data host, encrypting D1* with the public key of the recipient using asymmetric encryption, resulting in D1, and sending D1 to the receiving party; and the receiving party decrypting D1** using the receiving party's private key using asymmetric encryption resulting in D1*, decrypting the encryption key K1* with the receiving party's private key using asymmetric encryption resulting in K1, and decrypting the escrowed data D1* with the encryption key K1 using symmetric encryption resulting in D1 to thereby gain access to the data D1.

* * * * *